(12) United States Patent
Springer et al.

(10) Patent No.: US 12,319,172 B2
(45) Date of Patent: *Jun. 3, 2025

(54) FUEL CELL AUXILIARY POWER GENERATION SYSTEM FOR A VEHICLE

(71) Applicant: BWR Innovations LLC, Fargo, ND (US)

(72) Inventors: Timothy R. Springer, Fargo, ND (US); Joel A. Jorgenson, Fargo, ND (US)

(73) Assignee: BWR Innovations LLC, West Fargo, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/615,821

(22) Filed: Mar. 25, 2024

(65) Prior Publication Data

US 2024/0227627 A1    Jul. 11, 2024

Related U.S. Application Data

(63) Continuation of application No. 17/401,704, filed on Aug. 13, 2021, now Pat. No. 11,945,338.

(51) Int. Cl.
*B60L 50/75* (2019.01)
*B60L 58/40* (2019.01)
(Continued)

(52) U.S. Cl.
CPC ............... *B60L 58/40* (2019.02); *B60L 50/75* (2019.02); *H01M 8/04544* (2013.01);
(Continued)

(58) Field of Classification Search
CPC .......... B60L 58/40; B60L 50/75; B60L 50/70; B60L 58/31; H01M 8/04544;
(Continued)

(56) References Cited

U.S. PATENT DOCUMENTS 3,784,896 A    1/1974 Lakota
4,905,134 A    2/1990 Recker
(Continued)

FOREIGN PATENT DOCUMENTS

WO    2002066974 A2    8/2002

OTHER PUBLICATIONS

Synchrotact 5 Synchronizing and Paralleling Equipment and Systems for Synchronous Machines and Networks by ABB Automation; Exact Publication Date Unknown (Prior to Apr. 2004).
(Continued)

*Primary Examiner* — Elim Ortiz
(74) *Attorney, Agent, or Firm* — Neustel Law Offices

(57) ABSTRACT

A vehicle power system including a fuel cell auxiliary power unit for providing clean, efficient power to a vehicle. The system generally includes a fuel cell with a first DC output and a heat output, a pressure vessel adapted to contain and provide pressurized hydrogen to the fuel cell, an electrical storage unit with a DC input coupled to the first DC output of the fuel cell. The electrical storage unit also has a second DC output. An inverter is coupled to the second DC output of the electrical storage unit to receive power, the inverter having a first AC output. The system can provide heat, AC power, and DC power to the vehicle.

16 Claims, 12 Drawing Sheets

(51) Int. Cl.
  *H01M 8/04537* (2016.01)
  *H01M 8/04858* (2016.01)
  *H01M 8/0606* (2016.01)
  *H01M 8/0656* (2016.01)
  *H01M 16/00* (2006.01)
  *H02J 9/06* (2006.01)

(52) U.S. Cl.
  CPC ..... *H01M 8/04865* (2013.01); *H01M 8/0606* (2013.01); *H01M 8/0656* (2013.01); *H01M 16/006* (2013.01); *H02J 9/062* (2013.01); *H01M 2250/20* (2013.01)

(58) Field of Classification Search
  CPC ........... H01M 8/04865; H01M 8/0606; H01M 8/0656; H01M 16/006; H01M 2250/20; H02J 9/062; H02J 2310/48; H02J 15/008; H02J 7/34; Y02T 10/70; Y02T 90/40; Y02T 10/72; Y02T 10/7072; Y02E 60/50; Y02E 60/10; B64D 2041/005
  USPC ..... 429/515, 432, 444, 900, 431.43; 701/22; 307/9.1; 180/65.31
  See application file for complete search history.

(56) References Cited

U.S. PATENT DOCUMENTS

| | | | |
|---|---|---|---|
| 4,937,462 | A | 6/1990 | Recker |
| 5,317,500 | A | 5/1994 | Iden |
| 5,642,006 | A | 6/1997 | Cech |
| 5,767,591 | A | 6/1998 | Pinkerton |
| 6,080,500 | A | 6/2000 | Fuju |
| 6,112,136 | A | 8/2000 | Paul |
| 6,169,390 | B1 | 1/2001 | Jungreis |
| 6,172,432 | B1 | 1/2001 | Schnakenberg |
| 6,184,593 | B1 | 2/2001 | Jungreis |
| 6,239,997 | B1 | 5/2001 | Deng |
| 6,503,649 | B1 | 1/2003 | Czajkowski |
| 6,657,319 | B2 | 12/2003 | Sanada |
| 7,180,210 | B1 | 2/2007 | Jorgenson |
| 7,222,001 | B2 | 5/2007 | Frost |
| 8,203,231 | B2 | 6/2012 | Knepple |
| 8,347,645 | B1 | 1/2013 | Miller |
| 11,018,508 | B1 | 5/2021 | Jorgenson |
| 2002/0114983 | A1 | 8/2002 | Frank |
| 2003/0064260 | A1* | 4/2003 | Erdle ............... H01M 8/0656 429/422 |
| 2005/0183895 | A1 | 8/2005 | Severns |
| 2007/0193999 | A1 | 8/2007 | Peterson |
| 2007/0264537 | A1 | 11/2007 | Huang |
| 2009/0025315 | A1 | 1/2009 | Gutfleisch |
| 2009/0055031 | A1 | 2/2009 | Slota |
| 2009/0072791 | A1 | 3/2009 | Morita |
| 2012/0139354 | A1 | 6/2012 | Said |
| 2013/0183749 | A1 | 7/2013 | Aamodt |
| 2014/0277880 | A1* | 9/2014 | Takaku ............ H01M 8/04201 429/61 |
| 2015/0217869 | A1 | 8/2015 | Brunaux |
| 2016/0134124 | A1 | 5/2016 | Kaag |
| 2016/0339776 | A1 | 11/2016 | Oyobe |
| 2017/0314143 | A1 | 11/2017 | Emerick |
| 2018/0093655 | A1 | 4/2018 | Healy |
| 2019/0321500 | A1 | 10/2019 | Anderson |
| 2020/0075972 | A1 | 3/2020 | Jorgenson |
| 2020/0238839 | A1* | 7/2020 | Miyaki ................ B60L 50/71 |

OTHER PUBLICATIONS

A Fast Following Synchronizer of Generators; IEEE Transaction of Energy Conversion, vol. 3, No. 4; Dec. 1988.
High Integrity Power Control Systems for Critical Facilities by Russelectric; Exact Publication Date Unknown (Prior to Apr. 2004).
PCT International Search Report and Written Opinion for PCT/US2020/015545; Received on Apr. 28, 2020.
https://www.energy.gov/eere/fuelcells/fuel-cell-systems; Office of Energy Efficiency & Renewal Energy "Fuel Cell Systems"; Department of Energy; Jan. 26, 2017.
https://www.cdc.gov/infectioncontrol/pdf/guidelines/disinfection-guidelines-H.pdf; CDC "Guideline for Disinfection and Sterilization in Healthcare Facilities" Rutala; Department of Health and Human Services; 2008.
https://energy.gov/sites/default/files/2015/11/f27/fcto_fuel_cells_fact_sheet.pdf; Fuel Cells Technologies Office Fuel Cells Fact Sheet; Nov. 2015.
http://www.altergy.com/wp-content/uploads/2017/09/Altergy_Cable_Data_sheet_ATP_web.pdf; Altergy Cable/Multiple-System Operators Data Sheet; Received Aug. 28, 2019.
http://www.altergy.com/wp-content/uploads/2016/08/Altergy_CorpBro_Web_singlePg.pdf; Altergy Corporate Brochure; Received Aug. 28, 2019.
http://www.altergy.com/wp-content/uploads/2017/09/Altergy_Nacelle_Data_sheet_ATP_web.pdf; Altergy Freedom Power System Nacelle Data Sheet; Published Feb. 2017.
http://www.altergy.com/wp-content/uploads/2017/09/Altergy_PSP_Data_sheet_6_ATP_web.pdf; Altergy Public Safety Platform Data Sheet; Published 2017.
http://www.altergy.com/wp-content/uploads/2017/09/Altergy_Reformer_Data_sheet_7_ATP_web.pdf; Altergy Freedom Power System (FPS-EX) Data Sheet; Published Jun. 2018.
http://www.altergy.com/wp-content/uploads/2018/07/Altergy_TSP_Data_sheet_2018_ATP_web.pdf; Altergy Traffic Signal Platform (TSP) Data Sheet; Published 2018.
http://www.altergy.com/products-2/enclosures/; Altergy Enclosures Webpage; Received Aug. 28, 2019.
http://www.altergy.com/products-2/mobile-solutions/; Altergy Mobile Solutions Webpage; Received Aug. 28, 2019.
https://www.hydrogenics.com/hydrogen-products-solutions/fuel-cell-power-systems/; Hydrogenics HyPM-HD Power Modules Brochure; Published Feb. 2018.
https://www.hydrogenics.com/technology-resources/media-downloads-table/; Hydrogenics HyPM-XR Back-Up Power Fuel Cell Brochure; Published May 2016.
https://www.hydrogenics.com/technology-resources/media-downloads-table/; Hydrogenics HyPM Rack Brochure; Published Mar. 2014.
https://www.intelligent-energy.com/uploads/product_docs/49087_IE_-_FCM_brochure_May_2018.pdf; Intelligent Energy 800 Series Fuel Cell Module Brochure; Published May 2018.
https://www.intelligent-energy.com/uploads/product_docs/Final_UAV_brochure_Sept_2018_web.pdf Intelligent Energy UAV Fuel Cell Power Module Brochure; Published Aug. 2018.
https://www.plugpower.com/wp-content/uploads/2016/03/2016_GenKey_Stationary020816.pdf; Plug Power GenKey for Stationary Power Brochure; Published Feb. 8, 2016.
https://www.plugpower.com/wp-content/uploads/2018/06/2018GenKeyBrochure_F1Digi-1.pdf; Plug Power GenKey for Material Handling Brochure; Published Jun. 2018.
https://www.plugpower.com/products/progen/fuel-cells-for-industrial-robotics/; Plug Power ProGen Fuel Cells for Industrial Robotics Webpage; Received Aug. 28, 2019.
https://www.arema.org/files/library/2014_Conference_Proceedings/Fuel_Cell_Technology_For_Backup_And_Supplemental_Power_Applications.pdf; Arema Fuel Cell Article; Jun. 13, 2014.
https://www.plugpower.com/wp-content/uploads/2015/05/Intelec2011_ReliOn_P081_IEEE.pdf; ReliOn Smart Energy Solutions Article; Joe Blanchard; Published Nov. 2011.
https://www.plugpower.com/wp-content/uploads/2015/05/ReliOnIntelec_2013Paper.pdf; ReliOn Superstorm Sandy: Fuel Cell Design Article; Spink and Saathoff; Published 2013.
https://www.plugpower.com/wp-content/uploads/2018/06/2018_GenFuelSpec_F1Digi.pdf; Plug Power GenFuel Hydrogen Solutions for Material Handling Applications; Published Jun. 2018.
https://www.plugpower.com/wp-content/uploads/2016/03/GenSureProductCatalogsm_012716.pdf; Plug Power GenSure Fuel Cell Systems Product Catalog; Published Mar. 2016.

(56) References Cited

OTHER PUBLICATIONS https://www.plugpower.com/wp-content/uploads/2014/12/ColdStorageDigi_F_101716.pdf; Plug Power GenDrive Fuel Cells for Cold Chain Environments Brochure; Published Dec. 2014.
https://www.plugpower.com/wp-content/uploads/2016/07/Mfg_mktg_Final072216.pdf; Plug Power Fuel Cells for Manufacturing Facilities Brochure; Published Jul. 2016.
https://www.plugpower.com/wp-content/uploads/2019/04/ProGenSpec_Mobility_Digi0219.pdf; Plug Power ProGen Fuel Cell Power for E-Mobility Applications; Published Apr. 2019.
PCT International Search Report and Written Opinion for PCT/US2019/48543; Nov. 27, 2019.
PCT Search Report and Written Opinion for PCT/US21/47451; Dec. 6, 2021.

\* cited by examiner

FUEL CELL AUXILIARY POWER GENERATION SYSTEM FOR A VEHICLE

CROSS REFERENCE TO RELATED APPLICATIONS

The present application is a continuation of U.S. application Ser. No. 17/401,704 filed on Aug. 13, 2021 (Docket No. JORG-040). Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

The described example embodiments in general relate to an auxiliary power system for a vehicle for providing electrical power to a vehicle.

Auxiliary Power Units (APUs) have been in use for a number of years to provide electricity and energy to vehicles. One typical requirement for APUs is that they can be self-contained in a vehicle, such that they can provide power without receiving fuel or other inputs from outside of the vehicle for which they are providing power. In many applications, auxiliary power units (APUs) are used as a short-term means to provide power when a primary power unit is unavailable. In aviation applications, APUs provide power to an airplane on the tarmac or in a hangar, allowing systems to be operated without using the main aircraft engines. In trucks, APUs can provide power to a parked vehicle for air conditioning, heating, and other appliances without the operation of the vehicle engine. In both cases, the APU is an essential and important component of operation.

APUs to date have typically been powered by smaller engines (relative to the main engine(s)) that can, but don't necessarily, use the same fuel as the main engines of the vehicle. For example, an APU designed for use in a truck may be powered by a small diesel engine, burning the same fuel as the primary engine, with a shared coolant and electrical system. The smaller APU engine operates with less noise, consumes less fuel, and produces less emissions than the main vehicle engine. However, the issues of noise, pollution, and maintenance of the primary engine still exist with the smaller APU engine. APU engines also have an ongoing maintenance need for scheduled oil changes, filter changes, preventative repairs, and unscheduled repairs. The emissions include, but are not limited to, carbon dioxide, sulfur oxide, and nitrogen oxide, which all detrimentally affect climate.

The issues presented by APUs powered by small internal combustion engines or turbine engines becomes problematic, either because of the growing costs realized by the operator or because of regulations that might be directed by government agencies. While each APU engine may not produce a large volume of harmful emissions individually, the large number of small engines collectively adding to greenhouse gases presents a problem globally. Therefore, a solution must be found to provide the needed electricity and heat to power appliances and provide heating or cooling without the production of harmful emissions contributing to climate change.

SUMMARY

Some of the various embodiments of the present disclosure relate to a fuel-cell APU that can provide electrical power and heat to a vehicle. Some of the various embodiments of the present disclosure include a fuel cell comprising a first DC output and a heat output and may also include a pressure vessel adapted to contain and provide pressurized hydrogen to the fuel cell. The APU also has an electrical storage unit comprising a DC input coupled to the first DC output of the fuel cell, the electrical storage unit further comprising a second DC output, and an inverter coupled to the second DC output of the electrical storage unit to receive power. The inverter has a first AC output that provides electrical power to the vehicle, and the heat output also provides heat to the vehicle.

In some embodiments, the APU may include a second fuel cell, electrical storage unit, and inverter, such that the second part of the system can be paralleled with the first part, to provide additional power when needed. In some other embodiments, the APU may be operated in conjunction with a controller that is adapted to receive user inputs, such as inputs from a wired input or from a remote computing device. The controller is capable of operating the system by, for example, activating or deactivating the APU, and also by sending commands to one or more contactors connected to selectively connect or disconnect electrical power from the vehicle.

There has thus been outlined, rather broadly, some of the embodiments of the present disclosure in order that the detailed description thereof may be better understood, and in order that the present contribution to the art may be better appreciated. There are additional embodiments of that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
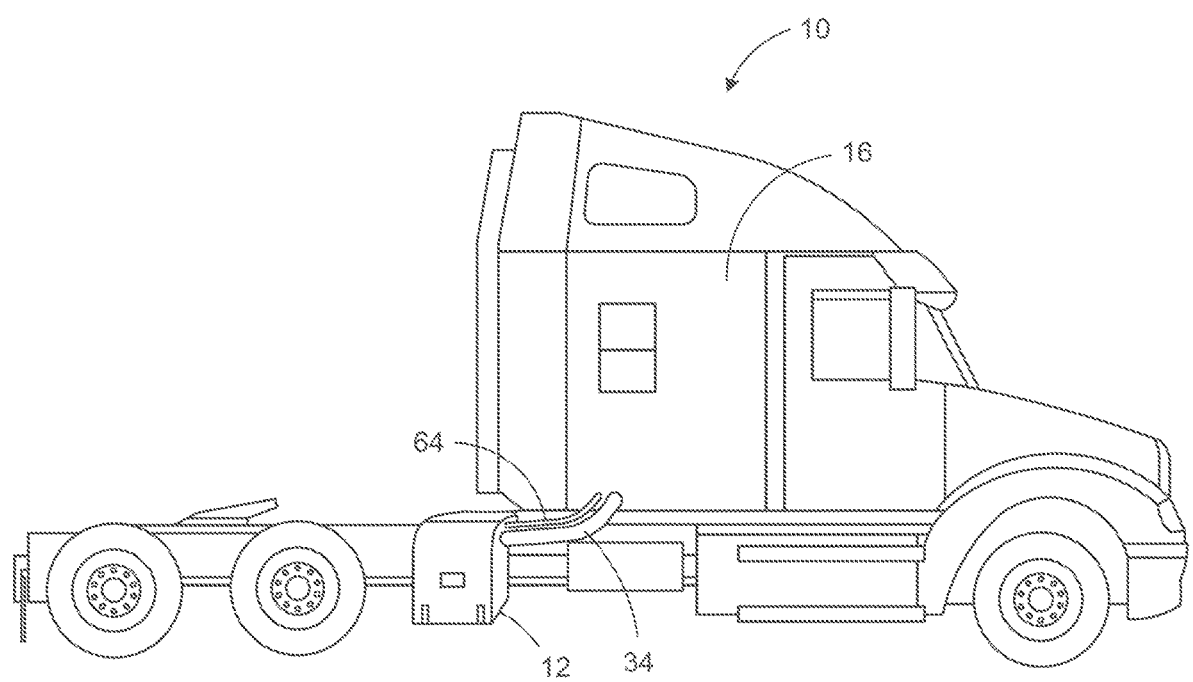
FIG. 1 is a side view of a vehicle for which the present system can be used, in accordance with an example embodiment.

Some of the various embodiments of the present disclosure relate to a fuel-cell powered APU 120 that can provide heat and electrical power to a vehicle 10. Example vehicles may include large trucks, aircraft, boats, or other vehicles. The embodiments include a fuel cell 30 that converts hydrogen and atmospheric oxygen into DC power. Note that the term "fuel cell" may include more than a single fuel cell, as multiple cells may be necessary to increase voltage or current capacity of the fuel cell unit. The DC power can be provided to an electrical storage unit 40, such as capacitors, supercapacitors, batteries, or any combination of such components. The APU 120 may also include a controller 70 to control the application and provision of power to the vehicle's electrical distribution system, and for engaging or disengaging any system components for providing power to the vehicle 10.

The APU 120 may be installed in an APU compartment 12, which may be a compartment on the exterior of vehicle 10, and may be contained, along with any peripheral components, in the compartment interior 14, which may be closed to the environment by a door. The compartment 12 should be suitable for containing any needed systems, and may also be certified for regulatory approval.

Some of the various embodiments of the present disclosure include a fuel cell 30 comprising a first DC output 32, an electrical storage unit 40 (which may be or include a battery or batteries) comprising a DC input 42 coupled to the first DC output 32 of the fuel cell 30, the electrical storage unit 40 further comprising a second DC output 44. The APU 120 also includes an inverter 50, having a DC input 52 coupled to the second DC output 44 of the electrical storage unit 40 to receive power, the inverter 50 comprising a first AC output 54. The APU 120 also includes a contactor 60 connected between the first AC output 54 and an AC load bus 63, the AC load bus 63 comprising an AC voltage. The controller 70 has inputs 76, 78 adapted to sense a phase, a frequency, and a magnitude of the first AC output 54 and the AC voltage on the load bus, respectively.

In some embodiments, the second DC output 44 may be used to provide DC power to the vehicle 10. Such DC power can be used to power DC electrical accessories or appliances, engine heaters, etc., and also to charge the vehicle's main battery. Both the DC output 44 and the AC output of the system can be provided and distributed by a combined output 64, which may include any number of shielded or unshielded, insulated conductors. The conductors may be connected to remote loads, as described herein, either directly, indirectly with filtering and suppression circuitry and components, or via additional power conversion circuitry. Such power conversion circuitry may produce a DC output separate from, and having a different magnitude than, the DC output of the fuel cell, and may comprise, for example, a DC-DC converter.

The source of energy for the fuel cell(s) 30 is hydrogen, which may be, for example, delivered to the fuel cell 30 via a regulated hydrogen supply line 22 to a compressed hydrogen pressure vessel 20. The hydrogen pressure vessel 20 may be refilled with hydrogen via a connection to an external source. In addition to having hydrogen sourced remotely and transported to the pressure vessel 20, hydrogen can be produced locally by one or more hydrogen generators 90 (i.e., within the vehicle 10 or APU compartment 12). One type of Hydrogen generator 90 may be a hydrogen reformer 94. Hydrogen reformers produce high purity hydrogen from a hydrogen-rich feedstock 98, such as methanol, ethanol, or ammonia.

Another type of hydrogen generator may be an electrolyzer 92. Electrolyzers produce hydrogen by applying energy to water, breaking the covalent bonds between oxygen and hydrogen. In either the case of the reformers or electrolyzers in example embodiments, the produced hydrogen is purified, compressed by a compressor 93, and stored in the pressure vessel 20. The advantage of producing the hydrogen locally is the amount of energy that may be stored as methanol, ethanol, ammonia, and/or water may be much higher with respect to volume than the amount of energy stored as compressed hydrogen. Also, the liquid components for hydrogen production (methanol, ethanol, and/or water) may be easier to locate and less expensive to procure than compressed hydrogen. A hydrogen generator 90 of either type described above may use electrical power from vehicle 10 to produce hydrogen.

In addition to electrical power, the APU 120 can also provide a direct heat output to vehicle 10, and more specifically, the heat output may provide heat to the a vehicle compartment, such as a vehicle cab 16, via one or more heat output lines 34. The heat output provided to heat output line 34 is supplied from the fuel cell, because, as it is known, fuel cells produce both heat and electricity during operation.

The controller 70 controls the phase, the frequency, and the magnitude of the first AC output 54 of the inverter 50. The controller 70 may further comprise an output command 72 to selectively activate the contactor 60 when a relationship between the phase, the frequency, and the magnitude of the first AC output 54 and the AC load voltage are substantially matched, for systems wherein an AC load is powered by more than one source, or by an APU with multiple AC outputs, or by multiple APUs.

In some example embodiments, the controller 70 is usable to adjust the phase, the frequency, and the magnitude of the first AC output 54 of the inverter 50 to cause those parameters to substantially match the phase, the frequency, and the magnitude of an AC voltage on the AC load bus 63 before the controller 70 sends the output command to activate contactor 60. In still other embodiments, the controller 70 is further adapted to communicate with a remote computing device 100, which may be a wired or a wireless device. The remote computing device 100 is adapted to send a command to the controller 70 to connect the APU 120 to the AC load bus 63, and it may also perform other functions. As an example, the remote computing device 100 may be adapted to allow a user to monitor operating conditions of the APU 120. The remote computing device 100 may also be adapted to send a command to the controller 70 to disconnect the APU 120 from the AC load bus 63, or to remotely shut down the APU 120.

Further, the APU 120 may include more than fuel cell subsystem, such as a second fuel cell 30, inverter 50, and the other components mentioned above, and the components or subsystems can be connected in parallel. As an example, two or more subsystems may be connected in parallel to an AC load 63, such as a vehicle's existing wiring, effectively using that wiring as an electrical grid or microgrid. In such a case, one, two, or more subsystems can be connected to the AC load 63 while the bus is also powered by any AC power source, such as a vehicle's main electrical power system, with the APU 120 providing additional power capacity to the load.

The system also includes a telemetry component 80 for remote monitoring and system management. For example, parameters such as run time, fuel amount, power output, output voltage, output current, etc., may be monitored via telemetry. The telemetry component 80 also allows the remote computing device 100, such as a wireless phone, laptop, desktop computer, etc., to remotely start the system or any subsystem, shut down the system, or to connect or disconnect any individual contactor or group of contactors to vehicle power. The remote computing device 100 can be in communication with telemetry component 80 via communication link 82, and the telemetry component 80 can further communicate with controller 70 via telemetry to controller link 84. The remote computing device 100 may also communicate directly with controller 70 via its own communication link 79, to allow control of the system as described above.

B. Vehicle and APU Compartment

As discussed above, an example fuel-cell powered APU 120 can be used advantageously to provide heat and electrical power to a vehicle 10, as shown in FIG. 1. The APU 120 may include a controller 70 to control the application and provision of power to the vehicle's electrical distribution system, and for engaging or disengaging any system components for providing power to the vehicle 10.

Figure 2:
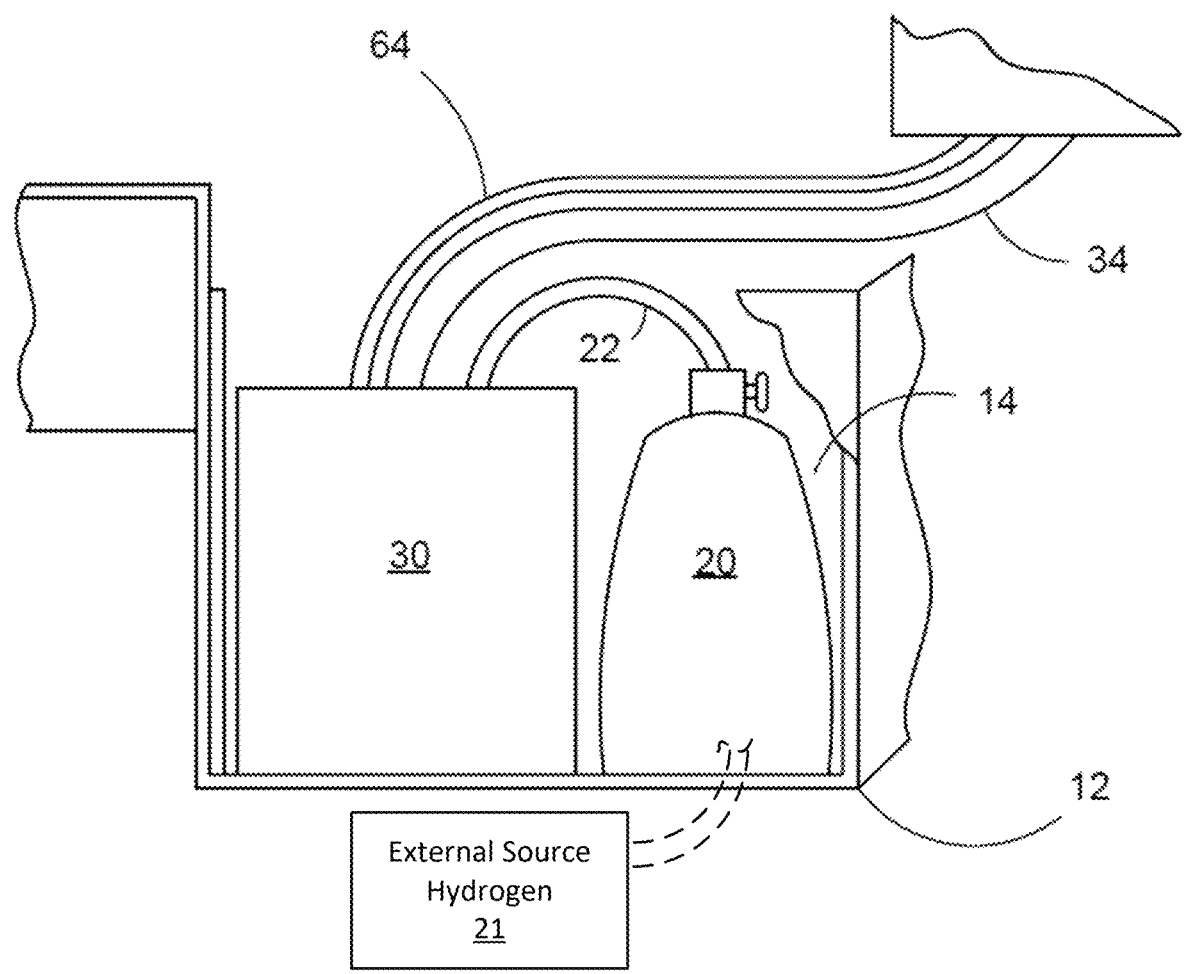
FIG. 2 is a detailed view of an Auxiliary Power Unit (APU) compartment on a vehicle, in accordance with an example embodiment.

The APU 120 may be installed in an APU compartment 12, which may be a compartment on the exterior of vehicle 10, and may be contained, along with any peripheral components, in the compartment interior 14, as shown in FIG. 2, which may be closed to the environment by a door. The compartment 12 should be suitable for containing any needed systems, and may also be certified for regulatory approval. As shown, the larger major components, such as the fuel cell 30 and hydrogen pressure vessel 20, are typically contained in the interior 14 of compartment 12, which may be mounted anywhere externally on a vehicle. FIG. 1 is only one possible mounting location. For example, an APU 120 could also be mounted in the rear-facing panels of a vehicle. This space has traditionally been occupied by auxiliary power units (APUs) using internal combustion engines a relatively safe place to exhaust poisonous emissions.

As mentioned, the APU, including the fuel cell, pressure vessel, and other components may be contained within compartment 12. The compartment 12 may be or include a mechanical system for vibration dampening, shock absorbing, filtration, circulation, and environmental protection.

C. Pressure Vessel and Fuel Cell

Figure 3:
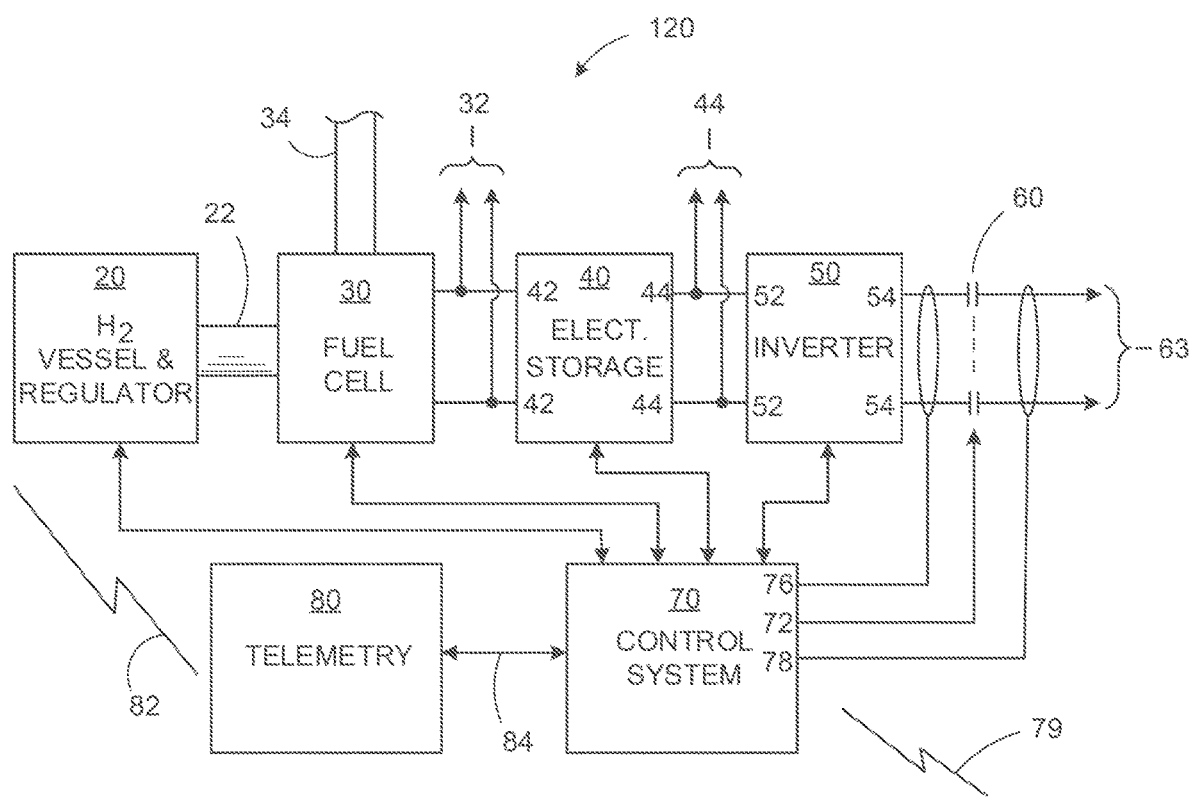
FIG. 3 is a simplified block diagram of an APU in accordance with an example embodiment.
Figure 4:
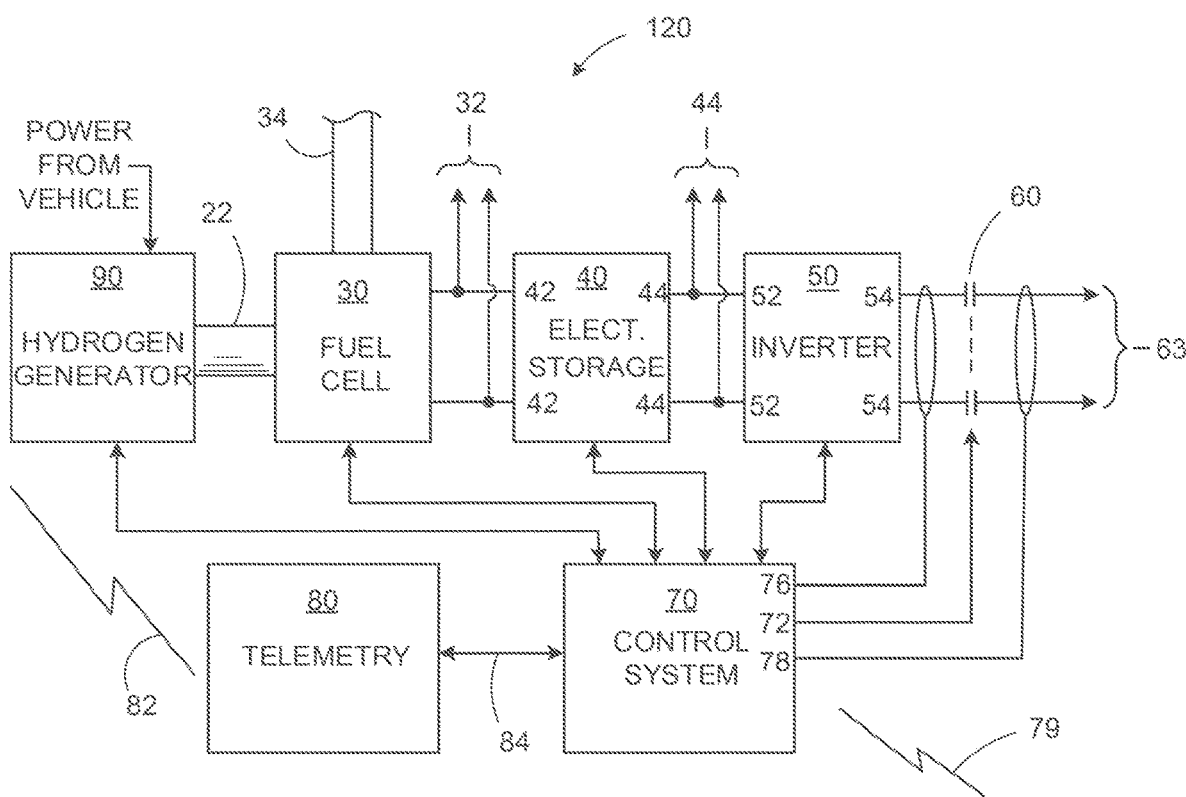
FIG. 4 is another simplified block diagram of an APU in accordance with an example embodiment.

The APU 120 may make use of compressed hydrogen gas contained in a pressure vessel (which may include a regulator) 20 as a source for the fuel cell 30. Compressed hydrogen gas is readily available from industrial gas suppliers, which may be used to recharge vessel 20. The hydrogen gas used to supply the APU is regulated to low pressures and provided over a supply line 22 to fuel cell 30, as generally shown in FIGS. 2-4. Compressed hydrogen gas is easy to use and transport, and provides for economical operation of the fuel cell 30. The output power and current of the fuel cell 30 are typically controlled by controlling the fuel flow input to the fuel cell 30. This can be optimized by the controller 70, which may monitor, through sensors, for example, conditions of the system, and which may also control the output of hydrogen from pressure vessel 20, as shown in FIGS. 3-4.

Despite the advantages of using compressed hydrogen gas, the APU 120 may alternatively use a different fuel in combination with a hydrogen generator 90, as also shown in FIG. 4. The output of the hydrogen generator 90 is fed to the fuel cell 30 by supply line 22, just as in the case where hydrogen gas is used directly. As an example, methanol or other hydrocarbons can be used as a feedstock to produce hydrogen. Once the hydrogen fuel is produced in the alternative embodiment, operation of the APU 120 is substantially the same.

Figure 5:
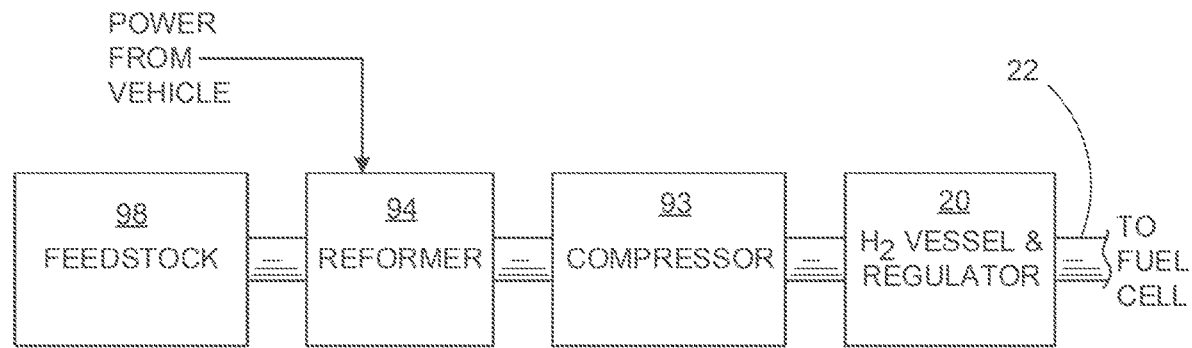
FIG. 5 is another simplified block diagram of an APU in accordance with an example embodiment.

As discussed above, the hydrogen pressure vessel 20 may be refilled with hydrogen via a connection to an external source. In addition to having hydrogen sourced remotely and transported to, or used to directly fill an installed pressure vessel 20, hydrogen can be produced by one or more hydrogen generators 90 (i.e., within the vehicle 10 or APU compartment 12). One type of Hydrogen generator 90 may be a hydrogen reformer 94. Hydrogen reformers produce high purity hydrogen from a hydrogen-rich feedstock 98, such as methanol, ethanol, or ammonia. A hydrogen reformer 94 may use electrical power from vehicle 10, as shown in FIG. 5, to produce hydrogen.

Figure 6:
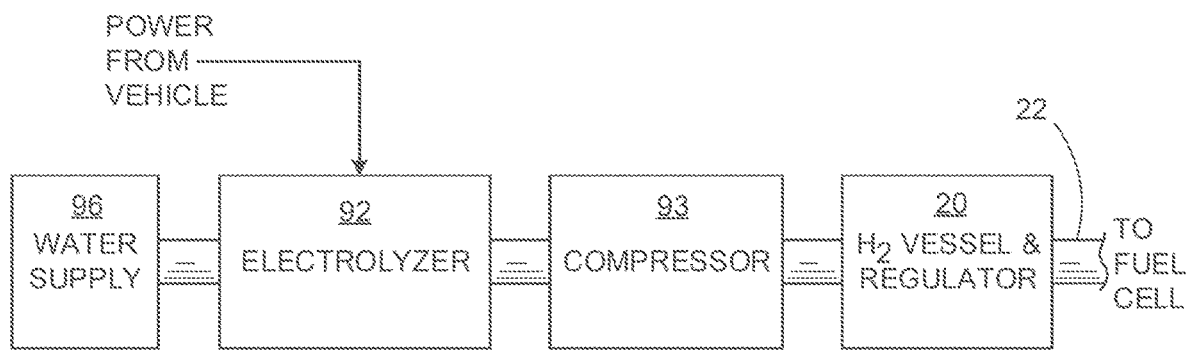
FIG. 6 is another simplified block diagram of an APU in accordance with an example embodiment.

Another type of hydrogen generator usable for local hydrogen production is an electrolyzer 92. Electrolyzers produce hydrogen by applying energy to water, breaking the covalent bonds between oxygen and hydrogen. An embodiment of the present disclosure using an electrolyzer as a hydrogen generator is shown if FIG. 6. In either the case of the reformers or electrolyzers, the produced hydrogen is purified, compressed by a compressor 93, and stored in the pressure vessel 20. As shown, a local water supply 96 can supply electrolyzer 92 with the water needed to produce hydrogen. The hydrogen produced by electrolysis will be uncompressed, so it will be supplied to a compressor 93, the output of which is connected to hydrogen pressure vessel and regulator 20.

The advantage of producing the hydrogen locally, such as with a reformer or electrolyzer, is the amount of energy that may be stored as methanol, ethanol, ammonia, and/or water may be much higher with respect to volume than the amount of energy stored as compressed hydrogen. Also, the liquid components for hydrogen production (methanol, ethanol, and/or water) may be easier to locate and less expensive to procure than compressed hydrogen.

In an example embodiment, the fuel cell 30 may comprise multiple fuel cells, which are designed to achieve the total voltage output and power desired. In each fuel cell of a system that uses hydrogen as fuel, electricity is generated with no combustion or harmful byproducts, by an electrochemical reaction that uses, for example, a stack of proton exchange membrane (PEM) fuel cells. PEM fuel cells have a high power density and operate at relatively low temperatures; as a result, they allow the fuel cell to quickly warm up and begin generating electricity. Other fuel cell technologies may also be used with the present system, such as alkaline fuel cells, zinc oxide, phosphoric acid fuel cells, molten-carbonate, solid oxide, etc.

As shown in FIGS. 2-4, the fuel cell 30 provides DC output (i.e., a first DC output) 32, which can be, but may not necessarily, used directly by the vehicle 10 for any DC load, appliance, etc. As shown, the DC output 32 is also provided as an input 42 to electrical storage unit 40. Fuel cell 30 also produces heat as a byproduct of its operation. To increase overall system efficiency, this heat can be provided to heat output 34, which may be used by vehicle 10 to heat vehicle cab 16, for example.

D. DC to AC Conversion

The electrical storage unit 40 is the first part of the system to receive power from the fuel cell 30, and it provides for storage of DC power that is to be provided to the inverter 50 for conversion to AC power. The electrical storage unit 40 may comprise one or more capacitors, one or more supercapacitors, a battery or bank of batteries, or other components suitable to receive and store DC electrical power to be provided to the inverter 50, as also shown in FIGS. 3-4. Electrical storage unit 40 receives power from the fuel cell DC output 32, at DC input 42, as shown, and provides power via DC outputs 44, which are coupled electrically (conductively) to inverter 50. DC output 44 may be supplied directly to any vehicle systems, components, appliances, etc., that require DC power. For this purpose, DC output 44 may be preferred to the DC output 32 from the inverter if the two are isolated, as the electrical storage 40 may be better able to respond to transient loads. If Electrical storage unit 40 is a battery, the DC input 42 may be conductively the same as DC output 44, although isolation is also possible, for example, if necessary to separate the input from the output using controller 70 or other means. Electrical storage unit 40 may comprise multiple high-capacity, high-power rechargeable batteries and a battery charging system (not shown), which receives input power from the fuel cell 30 and conditions it in order to keep the batteries of the storage unit 40 optimally charged. Electrical storage unit 40 may also be used to power the controller 70, as well as other components of APU 120, upon startup of the system.

One example purpose of the electrical storage unit 40 is to provide interim storage for the electrical loads (AC and/or DC) during operation, as a buffer for high transient demands. Accordingly, the electrical storage unit 40 can assist the fuel cells when the APU 120 is providing electricity to electrical appliances, etc. A second purpose is to provide storage for energy so that, when fully charged, the fuel cells 30 can enter a rest or a non-operating mode. This means of allowing the fuel cells 30 to charge the electrical storage unit or units 40, and the electrical storage units to be the first source of electricity for electrical appliances or other loads is analogous to a "bucket brigade".

The electrical storage unit 40 can also be charged from auxiliary sources. Photovoltaic devices, which convert light to direct current electricity, may capture solar energy and convert it to electricity. The vehicle 10 will typically also have its own electrical storage units, such as batteries, which can be used to charge (fully or partially) the electrical storage unit 40 of the APU 120. Additionally, the main engine of the vehicle 10 may be used to directly or indirectly produce electricity which may be used to charge the electrical storage unit 40.

In addition, since the electrical storage unit 40 is connected to the inverter 50, the unit 40 provides power to the inverter 50 along with that provided by the fuel cell 30, and thus may help the system meet higher transient power demands if the instantaneous power demanded of the system exceeds the capacity of the fuel cell 30. The electrical storage unit 40 also acts as an energy buffer, helping to provide a smooth any variability in the output of the fuel cell 30 before it reaches the inverter 50.

The inverter 50 may comprise a single inverter, or it may comprise two or even more units connected and controlled to operate in parallel. In any configuration, the inverter 50 is operated under the control of controller 70 to provide an adjustable, preferably sinusoidal AC output voltage that can be controlled in phase, frequency, and voltage to match any voltage present on an AC load bus 63, such as existing vehicle wiring. More specifically, the output of the inverter 50, once synchronized to an AC load 63, may readily be connected directly to a standard vehicle wiring system, and can in fact use the existing wiring as a grid which can provide power from any of a number of sources to any AC load connected to the wiring system.

The use of a battery (e.g., electrical storage unit 40) in the system provides a local means to store energy produced by the fuel cell 30 before being consumed by the electrical loads being powered. The storage unit 40 then provides instantaneous energy delivery, which provides a smoothing function for the load as the electrical demand changes in magnitude. The storage unit 40 can also provide startup power for the fuel cell 30 prior to the consumption of hydrogen for electrical production. The output of the storage unit 40 provides inputs to the inverter 50 for the production of AC power as well as directly providing DC power (either at voltage at the potential level of the batteries or at any other DC voltage via the means of a DC/DC voltage converter, regulator, or voltage division circuitry.)

For applications where the delivered AC energy is to be an AC waveform, inverter(s) are integrated to convert the DC electricity to AC waveforms. The AC waveform may be of selectable or adjustable voltage (for example, 120V or 240V), of selectable or adjustable frequency (for example, 50 Hz or 60 Hz), or phases (for example, single phase or three phase). In certain applications, multiple inverters 50 may be employed to create a plurality of AC voltages, where the settings of the first inverter (for example, 120V, 60 Hz, single phase) may be different than the settings of the second inverter (for example 240V, 50 Hz, three phase).

E. Controller

The controller 70 performs synchronization and control functions necessary for operation of the APU 120. Before the system is started and running, the electrical storage unit 40 (or the vehicle battery or electrical system) provides power to the controller 70, which may be off until a power or start button (such as on user input 74) is pressed, at which point the controller begins to operate. The controller 70 may control valves and regulators (not shown) used to activate the fuel cell 30, and also to regulate hydrogen flow and pressure to regulate the fuel cell output. The controller 70 also receives AC voltage inputs to monitor and control the output of the system, as shown in FIGS. 3-4, 7 and 9. For example, the controller receives AC input 76 from the output of inverter 50, to monitor and control the phase, frequency, and magnitude of the inverter 50. The controller 70 may comprise an analog synchronizer to bring these voltage parameters into substantial synchronization with the AC voltage on the AC load bus 63, monitored at input 78 of the controller 70. Additional details regarding synchronization and thresholds for closing contactor 60 may be found in U.S. Pat. No. 7,180,210, which is hereby incorporated by reference.

The controller also provides an output command 72 to selectively activate or deactivate a contactor 60. As shown in FIGS. 3-4, 7 and 9, contactor 60 is operable to connect and disconnect the AC output 54 from the AC load bus 63. Although the contactor is shown in the figures as having two contacts, different configurations are also possible. For example, the contactor 60 may be configured to connect or disconnect just the active voltage line, with neutral being directly connected. In addition, the system is shown as supplying a single phase, but in practice the system may be used with multiple phases or to supply both sides of a 240-volt (three-wire) configuration.

As discussed in greater detail below, when the AC output 54 of the inverter 50 is connected to the AC load bus 63, it can be done in a "make before break" manner, such that the AC output 54 is connected in parallel with the voltage already present on the load bus 63, which requires the synchronization, or substantial matching, of the AC output 54 to the voltage on the load bus 63.

In addition to the output control functions, the controller 70 may also be adapted to interface with, or to include, a telemetry component 80. If the telemetry is a separate component, it can be adapted to communicate with the controller 70 via an internal communication link 84, which may be in various forms, such as wired or wireless analog and/or digital links. In addition to the automatic functions of the controller 70, the APU 120 can use telemetry for remote monitoring and control, which can be done over a communications link 82, such as an air interface and internet connection, by way of non-limiting example. In addition, the APU 120 can be controlled remotely, via connection to a remote computing device 100, via another communications link 79, which may be wired or wireless.

Figure 9:
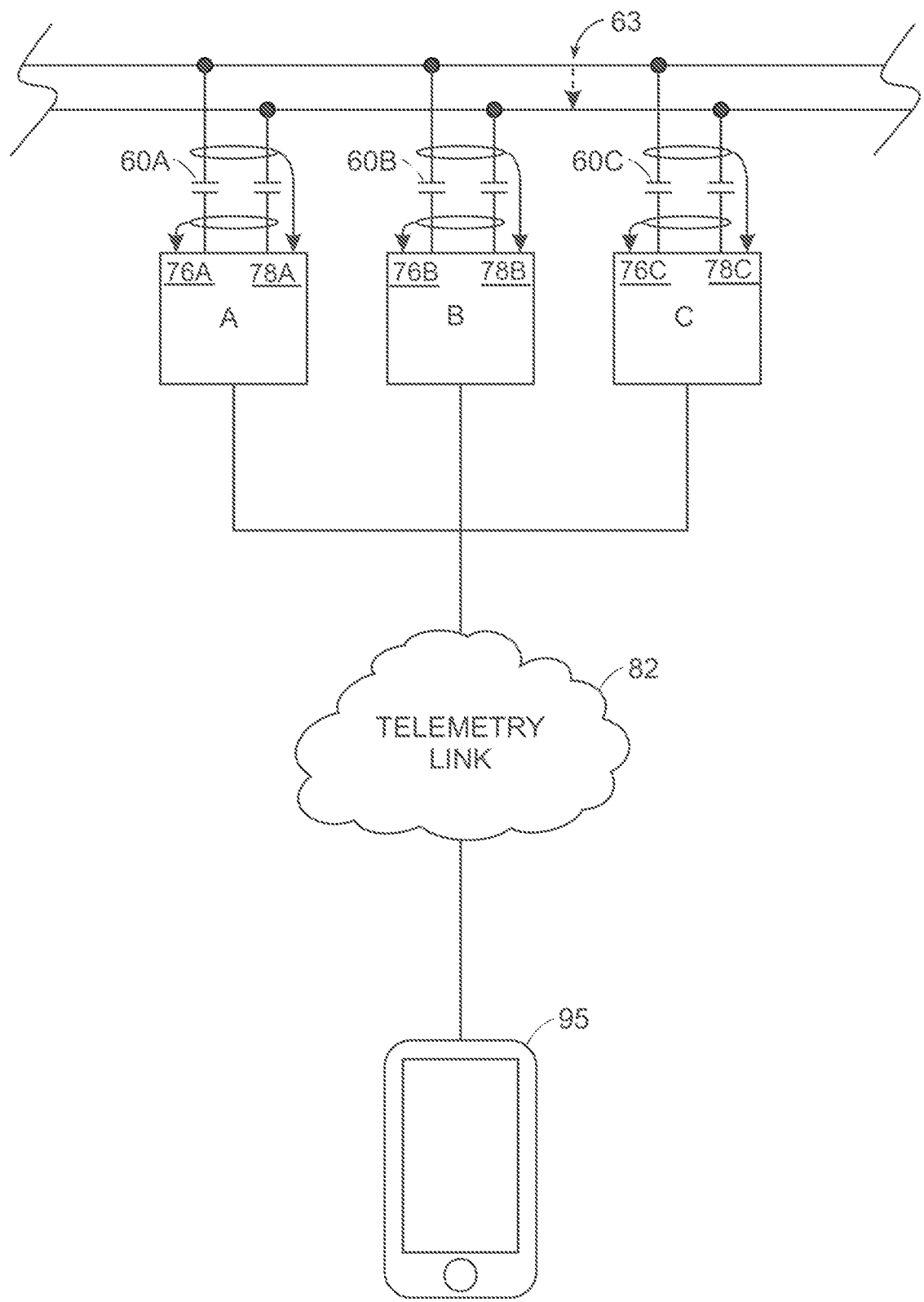
FIG. 9 is another simplified block diagram of a multi-output APU in accordance with an example embodiment.

An overview of the remote monitoring and control functionality is illustrated in FIG. 9, which shows a remote computing device, such as a smart phone, tablet, laptop or desktop computer, etc., in communication with three APU systems or subsystems A, B, and C, which is connectable to the load bus 63. As mentioned above, each subsystem A, B, and C may be configured substantially as the single unit shown in FIG. 3, which is possible because each subsystem can be connected in parallel, and can operate independently. Accordingly, element numbers followed by letters, such as 76A, are directly equivalent to numbers with no letters, such as 76, as represented in FIGS. 3-4, for example.

Figure 7:
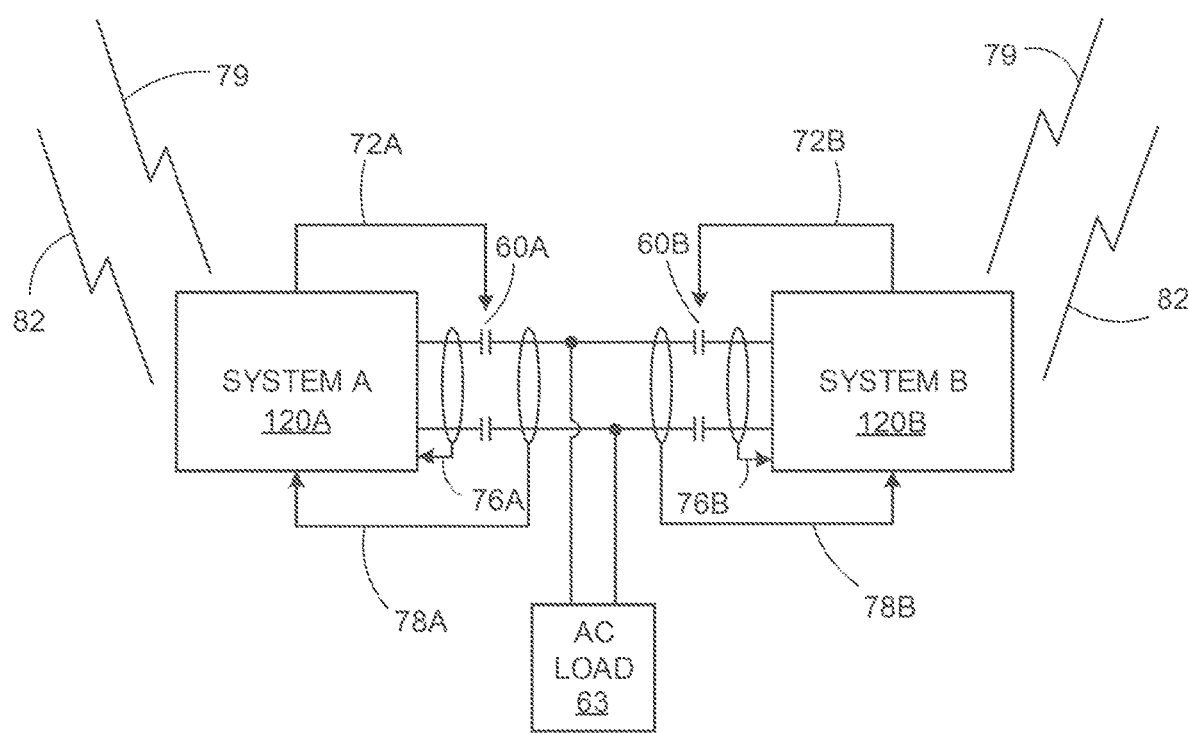
FIG. 7 is a simplified block diagram of a multi-output APU in accordance with an example embodiment.

As also shown in FIGS. 7 and 9, the controller of each subsystem receives AC voltage inputs to monitor and control the output of the system, and to synchronize all units with the AC voltage on the load bus 63. Alternatively, the system may power an otherwise unpowered load bus (e.g., with no AC main source connected) to provide auxiliary, emergency, or backup power.

In the embodiment of FIG. 9, each subsystem receives AC inputs 76A, 76B, or 76C from the output of each inverter 50, to monitor and control the phase, frequency, and magnitude of the inverter as described above. Each controller 70 may then bring the voltage parameters into substantial synchronization with any AC voltage on the AC load bus 63, monitored at inputs 78A, 78B, and 78C, as shown. As with the single system connection of FIGS. 3 and 4, each subsystem A, B, or C controls its own contactor, 60A, 60B, and 60C, respectively, in order to connect or disconnect the subsystem AC inverter output from the bus, again using the load bus 63 to substantially synchronize or substantially match the voltage parameters so that the systems can be connected in parallel.

FIG. 7 illustrates the system with two subsystems A and B connectable in parallel, where either or both subsystem can provide power to the load bus 63, either in addition to or in lieu of any AC source (if present) already providing power to the bus. As with the single system of FIG. 3, each subsystem includes an input 76A or 76B (directly equivalent to input 76 of FIG. 3) to monitor and control the inverter output voltage at AC output 54, as well as inputs 78A and 78B to monitor the AC load bus voltage for control purposes. In addition, each subsystem, A, B, has control over a contactor 60A or 60B to connect and disconnect the AC output voltage to or from the load bus 63, using control output commands 72A or 72B, as shown. The controller 70 can selectively activate or deactivate its corresponding contactor 60 automatically for any normal or emergency purpose, or in response to any user input, such as from user input 74 or remote computing device 100.

Since FIG. 7 simply illustrates two of the systems shown in FIG. 3, connectable in parallel, the labels appended with "A" and "B" are directly equivalent to the inputs, outputs, etc., without those designations as shown in FIG. 3.

In this configuration, both subsystems can be used to supply power in parallel with any AC source that powers AC load bus 63, or alternatively, to supply power to bus 63 with no AC main power available, in which case subsystem A and B would be synchronized with each other. For telemetry, the APUs may use communication link 82, to receive commands and allow for remote monitoring and control of the system. Alternatively, any commands can also be received by communication link 79.

As shown in FIGS. 7 and 9, two or more systems may be connected at the AC level via a means of synchronization to collectively supply the AC energy consumed by the electrical loads. The load sharing between two (or more) fuel cell systems allows the fuel cells to collectively supply the energy demanded by the load, where the instantaneous load is powered by the storage unit 40 connected to the loads via the inverter(s) 50, and the fuel cell(s) recharge the storage unit 40 to full capacity.

F. Operation of Preferred Embodiment

Figure 8:
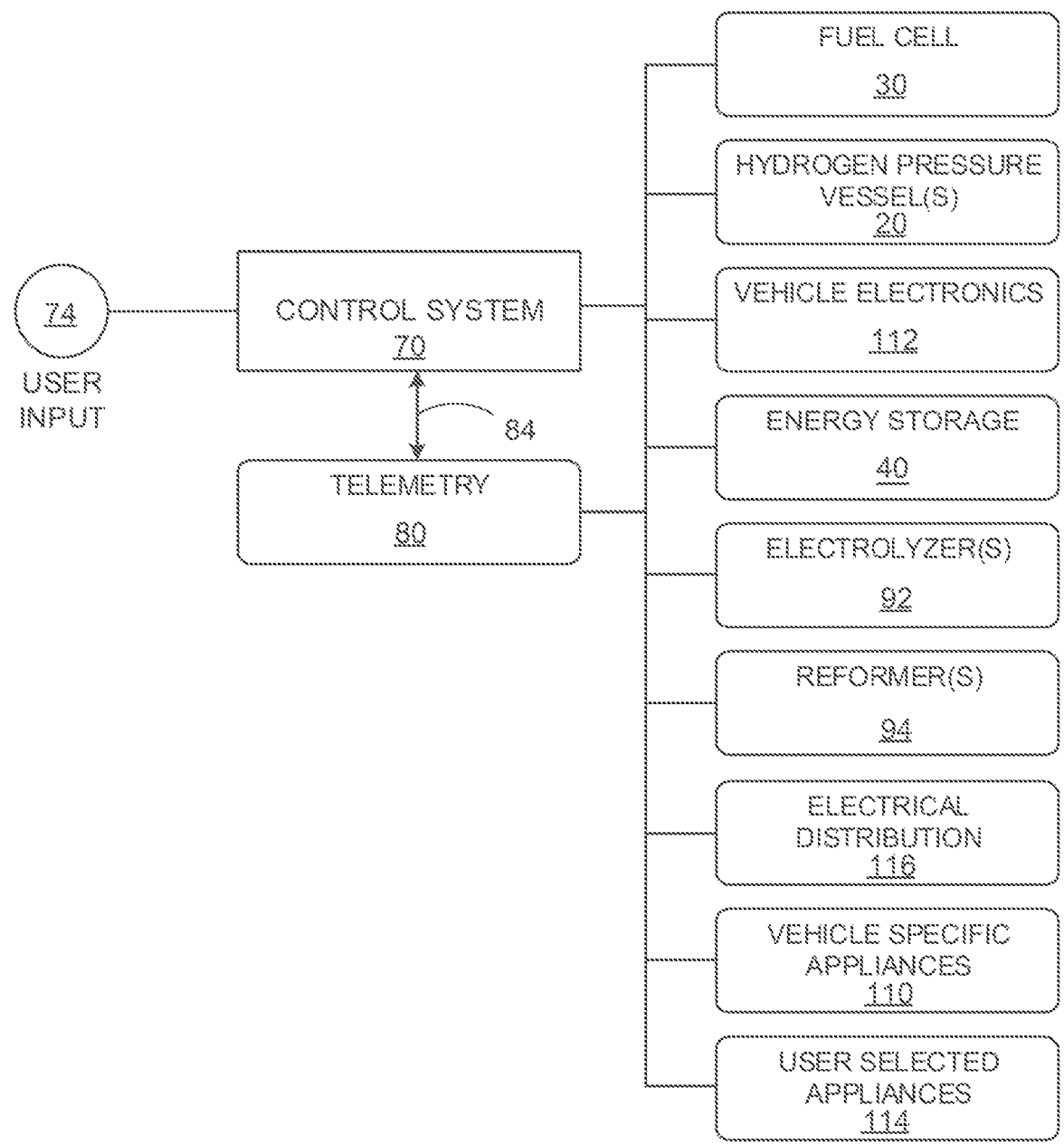
FIG. 8 is a simplified block diagram illustrating control and telemetry connections of an APU and vehicle systems in accordance with an example embodiment.
Figure 10:
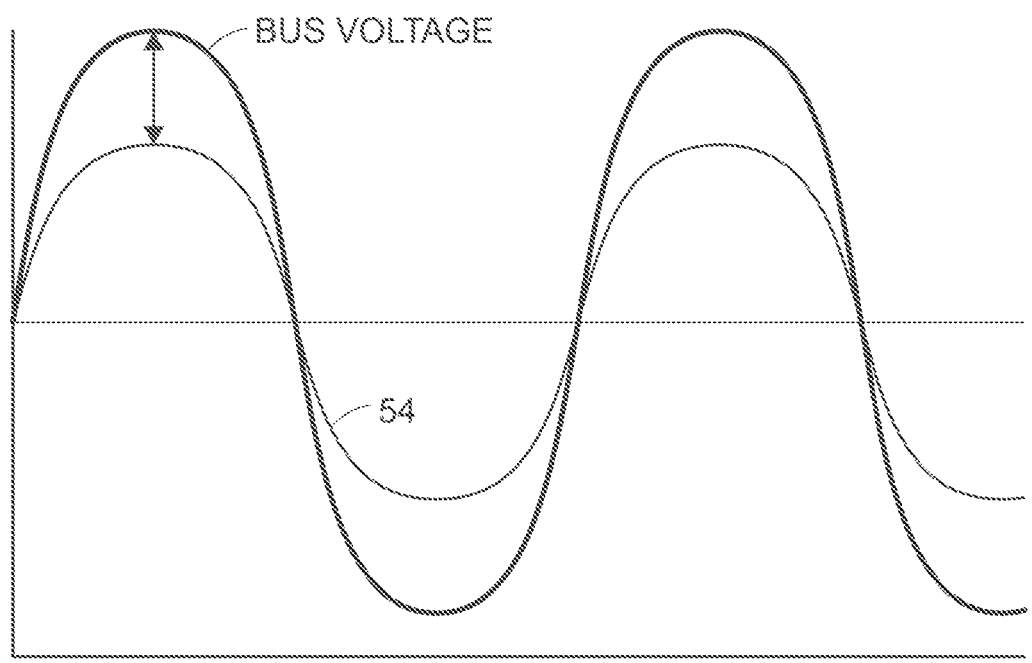
FIG. 10 illustrates AC voltage waveforms in accordance with an example embodiment.
Figure 11:
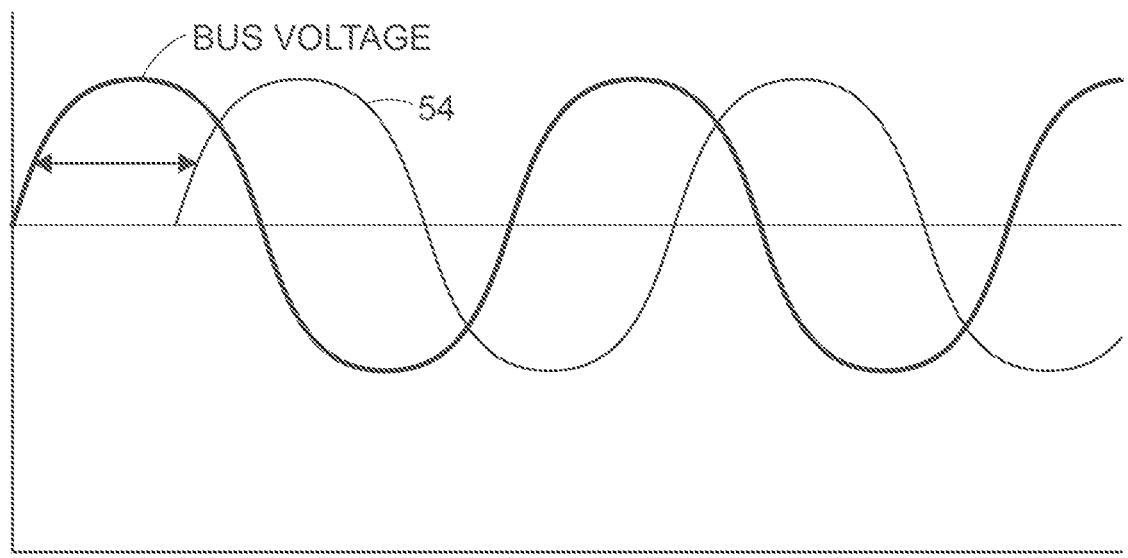
FIG. 11 is another illustration of AC voltage waveforms in accordance with an example embodiment.
Figure 12:
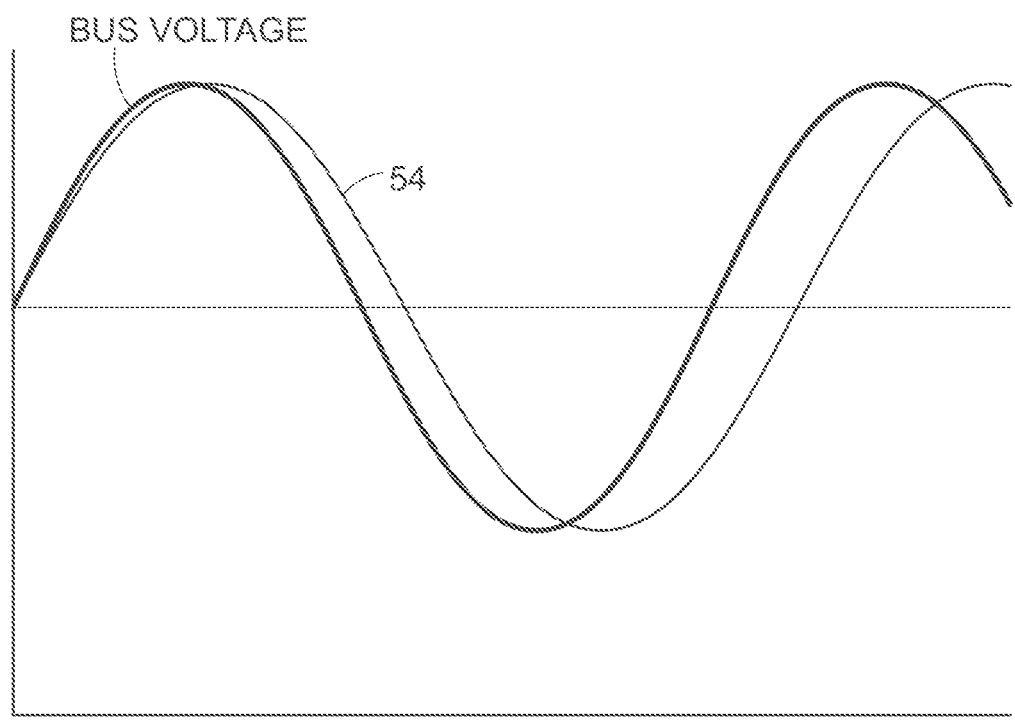
FIG. 12 is another illustration of AC voltage waveforms in accordance with an example embodiment.

In use, the APU 120 may be connected to an AC load bus and DC loads on a vehicle as shown for example in FIGS. 1-2 and 8. To start using the system, a power button (not shown) may be pressed, which applies power to the controller 70, activating the system, which in turn automatically starts the fuel cell operation. Until the fuel cell 30 is up and running normally (i.e., providing a DC output to the electrical storage unit 40 and the inverter 50) the electrical storage unit 40 can provide power to the system, including the controller 70. At this stage, by default, contactor 60 is deactivated. The controller then begins to monitor the phase, frequency, and voltage of the AC load bus 63, in the event that there is already voltage there, as supplied by another system or subsystem—that is, the voltage on the load bus 63, as well as those same parameters at the output of the inverter 50. Initially, there will be a difference in the parameters. For example, as shown in FIGS. 10, 11, and 12, there may be a difference in the voltage, the phase, and the frequency, respectively, between the bus voltage and the AC output 54 of the inverter 50. In the figures, these differences are indicated by the arrows.

As shown in FIG. 10, for example, the AC output 54 of inverter 50 is lower than the voltage present on the bus, while the other parameters, such as phase and frequency, are sufficiently matched. Thus, the controller can increase just the voltage output of the inverter until it substantially matches the bus voltage, which is simply the voltage on AC load bus 63 when contactor 60 is open. Then, when the voltage, as sensed by input 76, is substantially the same across the contacts of contactor 60, the controller 70 will send an output command 72 to the contactor to activate it, thus closing the contacts and paralleling the AC output 54 of inverter 50 with any other source that may be powering AC load bus 63. This same procedure is carried out with respect to phase and frequency differences, as shown in FIGS. 11 and 12, respectively.

The controller 70 will continue to monitor the voltages and adjust the output of the inverter 50 until the variable voltage parameters of the inverter 50 are within an acceptable threshold. This will allow contactor 60 to be closed, paralleling the two or more voltage sources without creating large transients on the load bus 63. For example, the frequency and the voltage may be matched to a close degree, such as within a few percent of each other. For phase, an acceptable threshold might be a phase difference of 5° or less, with the variable phase of the inverter's AC output 54 approaching, rather than moving away from, the phase of the voltage on the load bus 63. Other phase differences are also possible, and larger differences may be used, especially if the closing timing is performed by a circuit that detects zero crossings of the AC waveform to close the contactor 60 at or near zero crossings.

Once the AC output 54 has a voltage that is within acceptable limits, the controller 70 will send a command to contactor 60 to connect electrical power to the AC load bus 63, paralleling the inverter output with AC main power. This operation is the same whether there is just one, or multiple, subsystems connected to provide power, as shown for example in FIGS. 3, 4, 7, and 9. As discussed above, the system may also be used when there is no AC voltage present on the bus 63 being provided by another source. In such case, the controller will send a command 72 to close contactor 60 as soon as the output of inverter 50 is within acceptable parameters.

As mentioned above, the telemetry component 80, which may be in communication with controller 70 via link 84, also allows for remote monitoring and management of the APU 120, as well as vehicle appliances and systems that consume power from APU 120. Telemetry component 80 allows a user or users to monitor and control the system easily using a remote computing device 100, such as a smart phone, a tablet, a laptop, or a desktop computer, as just a few examples. The APU 120, or multiple APUs, may communicate with the remote computing device 100 via one or more communications or telemetry links 82. Parameters such as run time, remaining fuel amount, power output, state of charge, output voltage, output current, operating temperature (e.g., fuel cell temperature), hydrogen pressure, etc., may be monitored via telemetry component 80, with the information presented graphically or in table form, for example, at device 100.

Operating parameters and any other variables can be provided using analog, digital, or serial interfaces. As also shown in FIGS. 3-4, 8, and 9, the centralized control system, through controller 70, may also interface with telemetry component 80, to broadcast all parameters to an external host. The centralized control system may also receive information, settings, or commands from an external host via the telemetry component 80, or via a separate link such as link 79. The operating data may also be stored locally or in remote computing device 100 for reference later. In addition, remote computing device 100 may be used to control the system. Specifically, a user may remotely initiate startup, shutdown, connection, or disconnection of APU 120 from the load bus 63.

FIG. 8 represents a particular use of an APU 120, which is to provide auxiliary power capacity to a vehicle via an electrical distribution system 116, which may comprise AC and DC contactors, circuit breakers, filters, and vehicle wiring. As shown in the figures generally, especially FIGS. 1 and 2, an entire APU 120, which may be comprised of multiple fuel cells, inverters, electrical storage units, etc., is typically contained in a single compartment 12. As indicated in FIG. 8, the controller 70 can be used by a user, via inputs provided to user input 74 or remote computing device 100, to optionally engage or disengage specific appliances or systems powered by the vehicle's electrical distribution system 116. Such systems can include vehicle electronics 112, vehicle-specific appliances 110, and user selected appliances 114. The controller may also selectively provide power automatically as needed, such as for heating or air conditioning to the vehicle cab or an aircraft cabin under thermostatic control. The APU 120 may be operated without the ignition of aircraft engines or truck engines. In trucks, the APU 120 can provide power to a parked vehicle to power air conditioning, heating, and other appliances without starting or running the main engine. This saves wear and tear and maintenance of a truck's expensive diesel engine.

A centralized control system, which may comprise controller 70 and user input 74 or remote computing device 100, operates the APU 120, providing controls, safety oversight, and communications, via either wired or wireless means. The user input 74 allows a user to provide inputs to the APU. Such inputs may comprise, for example, specific temperatures for heating and air conditioning, which are part of the vehicle-specific appliances 110. As an added benefit of the system, heat may also be provided directly from the fuel cell 30 via heat output line 34 to the vehicle cab 16 or other occupied or equipment space where heat is needed.

The present system is inherently scalable and modular, which allows a system to be replicated and combined with other similar or identical systems to create larger systems (e.g., having greater electrical and/or heating capacity). For example, at the hydrogen level, multiple fuel cells may be combined to create a larger electrical and/or heat source. In addition, the DC output may be supplied to multiple individual inverters to create multiple AC circuits. Alternatively, multiple inverters can be paralleled to provide higher AC capacity by synchronizing the inverters to substantially match voltage, frequency, and phase.

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore desired that the various embodiments in the present disclosure be considered in all respects as illustrative and not restrictive. Any headings utilized within the description are for convenience only and have no legal or limiting effect.

What is claimed is:

1. A vehicle power system, comprising:
   an auxiliary power unit (APU) having a singular housing that is attached to a vehicle, wherein the APU supplies electrical power to an electrical system of the vehicle and wherein, within the singular housing, the APU includes:
   a fuel cell that produces a first DC output;
   a pressure vessel adapted to provide pressurized hydrogen to the fuel cell;
   an electrical storage unit having a DC input coupled to the first DC output of the fuel cell, wherein the electrical storage unit produces a second DC output;
   an inverter coupled to the second DC output of the electrical storage unit to receive power from the electrical storage unit and to produce a first AC output;
   a contactor connected between the first AC output and an AC load bus of the vehicle; and
   a controller that activates the first AC output responsive to a user input causing the first AC output to provide electrical power to the electrical system of the vehicle.

2. The vehicle power system of claim 1, wherein the second DC output provides electrical power to the electrical system of the vehicle.

3. The vehicle power system of claim 1, wherein the fuel cell produces a heat output that is supplied to the vehicle.

4. The vehicle power system of claim 1, wherein the user input comprises an input to activate APU.

5. The vehicle power system of claim 1, wherein the controller communicates with a remote computing device.

6. The vehicle power system of claim 5, wherein the controller receives the user input from the remote computing device.

7. The vehicle power system of claim 1, wherein activating the contactor causes the first AC output to be connected in parallel with the AC load bus.

8. The vehicle power system of claim 1, wherein the singular housing of the APU includes a door providing access to an interior of the singular housing.

9. The vehicle power system of claim 1, wherein the pressure vessel is couplable to an external pressurized hydrogen supply.

10. A vehicle power system, comprising:
    an auxiliary power unit (APU) having a singular housing that is attached to a vehicle, wherein the APU supplies electrical power to an electrical system of the vehicle and wherein, within the singular housing, the APU includes:
    a fuel cell that produces a first DC output;
    a hydrogen generator that generates hydrogen;
    a compressor that compresses the hydrogen generated by the hydrogen generator and that supplied compressed hydrogen to the fuel cell;
    an electrical storage unit having a DC input coupled to the first DC output of the fuel cell, wherein the electrical storage unit produces a second DC output;
    an inverter coupled to the second DC output of the electrical storage unit to receive power from the electrical storage unit and to produce a first AC output;
    a contactor connected between the first AC output and an AC load bus of the vehicle; and
    a controller that activates the first AC output responsive to a user input causing the first AC output to provide electrical power to the electrical system of the vehicle.

11. The vehicle power system of claim 10, wherein the hydrogen generator comprises a hydrogen reformer.

12. The vehicle power system of claim 10, wherein the hydrogen generator comprises an electrolyzer.

13. The vehicle power system of claim 10, wherein the electrical system of the vehicle powers the hydrogen generator.

14. The vehicle power system of claim 10, wherein the second DC output provides electrical power to the electrical system of the vehicle.

15. The vehicle power system of claim 14, wherein the fuel cell produces a heat output that is supplied to the vehicle.

16. The vehicle power system of claim 10, wherein activating the contactor causes the first AC output to be connected in parallel with the AC load bus.

* * * * *